July 6, 1926.

J. L. LUNDBERG 1,591,391

TRANSMISSION

Filed Feb. 15, 1924

Inventor
John L. Lundberg
By Stuart C. Barnes
Attorney

July 6, 1926.

J. L. LUNDBERG 1,591,391

TRANSMISSION

Filed Feb. 15, 1924

Inventor
John L. Lundberg

By Stuart C Barnes
Attorney

July 6, 1926.

J. L. LUNDBERG

TRANSMISSION

Filed Feb. 15, 1924

Inventor
John L. Lundberg.

By Stuart C Barnes
Attorney

Patented July 6, 1926.

1,591,391

UNITED STATES PATENT OFFICE.

JOHN L. LUNDBERG, OF ALPENA, MICHIGAN, ASSIGNOR TO HURON INDUSTRIES, INCORPORATED, OF ALPENA, MICHIGAN, A CORPORATION OF MICHIGAN.

TRANSMISSION.

Application filed February 15, 1924. Serial No. 693,212.

This invention relates to a transmission that is particularly adapted for reducing speed, more commonly known to the trade as a speed reducer.

This transmission is adapted to be coupled up directly with a motor, the driven end of the transmission being coupled up to the machinery which is desired to be driven at a reduced speed. Some of the machinery for which transmissions of this character are used are stone crushers or large screw conveyors which are generally driven at a greatly reduced speed. The normal speed of a heavy duty motor runs from around 500 to 1,000 R. P. M. In machines of this character considerable resistance is met with in driving the screw or rotating parts of the crusher, and this resistance is especially emphasized in a screw conveyor for pushing heavy bodies from one place to another. This thrust is transmitted directly to the driving shaft connected to the machine which is directly connected to the transmission. In the past it has been the custom to interpose a separate thrust bearing between the transmission and the screw conveyor for the purpose of absorbing this end thrust. In my machine, however, I carry this thrusting stress directly into the transmission housing and provide a thrust bearing within the transmission housing, the thrust being thereby absorbed by the housing thus relieving the transmission mechanism from the said longitudinal thrust. This consequently relieves the drive shaft which is connected to the motor and provides an easy running and efficient transmission in which there is a minimum amount of friction retarding the working of said transmission mechanism.

The construction of the transmission is such, that the majority of the transmission gears are rotatably supported on stationary shafts requiring only ordinary bushings to provide a bearing for said rotating parts. In the past it has been customary to construct the transmission with moving shafts supported by more complicated bearings because of the fact that the thrust is not all absorbed before it is imparted to the transmission mechanism. The novel arrangement of the transmission mechanism will be apparent from the more detailed specification.

Another feature of my invention is the lubrication of the rotating parts which requires a minimum amount of oil and a minimum amount of attention. In fact, it is possible to run this transmission for a couple of years without changing the oil or overhauling or replacing any of the bearings. The machines now on the market are guaranteed to run for 1,000 hours which is considerably less than the length of time my machine will run without attention. The lubrication of the present machines is carried out through a splash system and has not proven entirely satisfactory.

In my transmission I provide a force feed for lubricating the bearing parts, the pump for providing said force feed located within the transmission housing and provided with a driving connection with one of the rotating shafts. Another feature of the invention is that I have provided a reservoir within the housing in which the oil is pumped from the bottom of the transmission housing, and conduits leading from this reservoir conduct the oil to the several hollow shafts which distribute the lubricating oil to the several bearings. When my transmission is used indoors it is possible to use a very heavy oil although when the same is used in outdoor work where the temperature is lower, a lighter oil is put in the transmission so that the oil is of the proper density.

Many features of this transmission will be apparent from the description, and obviously, this transmission could be utilized in connection with many kinds of machinery, but as I said before, it is especially adapted for heavy machinery which imparts a heavy longitudinal thrust to the driving shaft and where the speed of the driving motor is desired to be greatly reduced.

$a$ designates the driving shaft which is adapted to be directly connected to a source of power such as an electric motor (not shown). $b$ designates the driven shaft which is adapted to be coupled up with the machinery (not shown) that is to be driven. $c$ designates the housing which is bolted as at $d$ to a base plate or support $e$.

The housing $c$ contains the entire transmission mechanism or change speed gears which will now be described more in detail. A spur gear $f$ is provided with an elongated hub $g$ which is bored as at $h$ to receive the driving shaft which is keyed or otherwise secured thereto. A stationary bearing $i$ supports this rotating hub within the housing. Meshing with the spur gear $f$ is a larger gear $j$. This latter gear is keyed to the hub $k$ of the gear $m$, the gear $m$ being of smaller diameter than the gear $j$. Bearings $n$ are carried by this hub and the two gears $m$ and $j$ which I thus secure together as a unit are rotatably supported on the stationary shaft $o$. This shaft $o$ is supported at one end in a bearing $p$ keyed at the end of the housing while the other end of the shaft is supported in the bearing $q$ carried by a bridge $r$ integrally cast with the housing and extending transversely thereof. Set screws $s$ shown in Figs. 2 and 5 lock the stationary shaft $o$ against longitudinal or rotative movement. A support $t$ cast in the housing supports one end of the stationary shaft $u$ while the other end of said shaft is supported at the other end of the housing as at $v$ (see also Fig. 10). Set screws $u^2$ prevent the longitudinal or rotative movement of the stationary shaft $u$. This stationary shaft $u$ rotatably supports a gear $w$ which is provided with a very long hub $x$ and suitable bearings $y$. Secured on the end of the hub $x$ is a gear $z$ which is adapted to mesh with the gear $m$. The middle portion of the hub $x$ is rotatably supported in the bearing 1 carried by the transverse bridge $r$. This arrangement supports the long stationary shaft $u$ at three points and provides a rigid structure for this part of the transmission mechanism. The gear $w$ meshes with a large gear 2 which is keyed or otherwise secured to the driven shaft $b$. It can be plainly seen this transmission mechanism connects the driving shaft $a$ with the driven shaft $b$ in such a manner as to drive the latter at a much reduced speed. Suitable bearings 3 and 4, Figs. 1 and 11, rotatably support the driven shaft $b$, the stationary bearing 3 carried by the end of the housing and the stationary bearing 4 carried by the bridge $r$ which is part of the housing.

Figure 7:
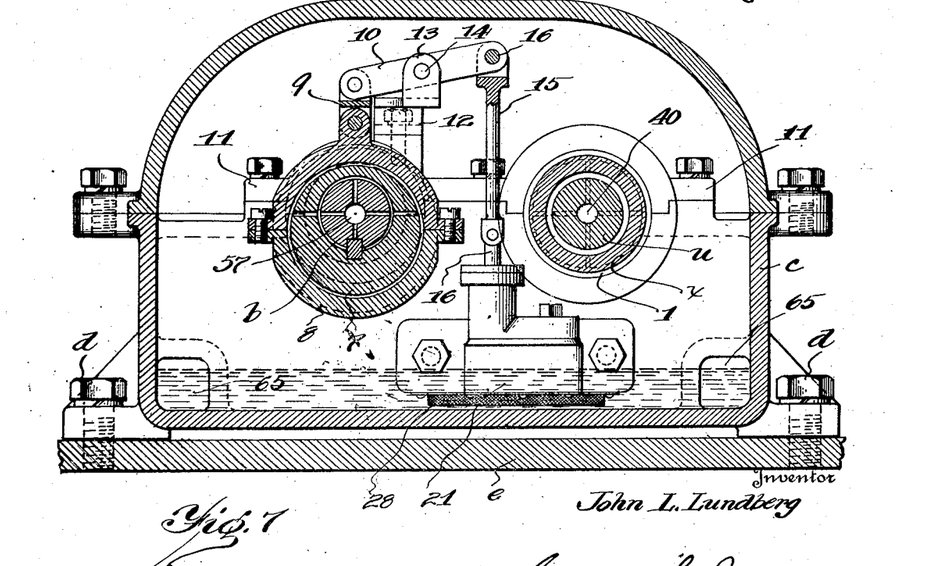
Fig. 7 is a section taken on the line 7—7 of Fig. 1.
Figure 8:
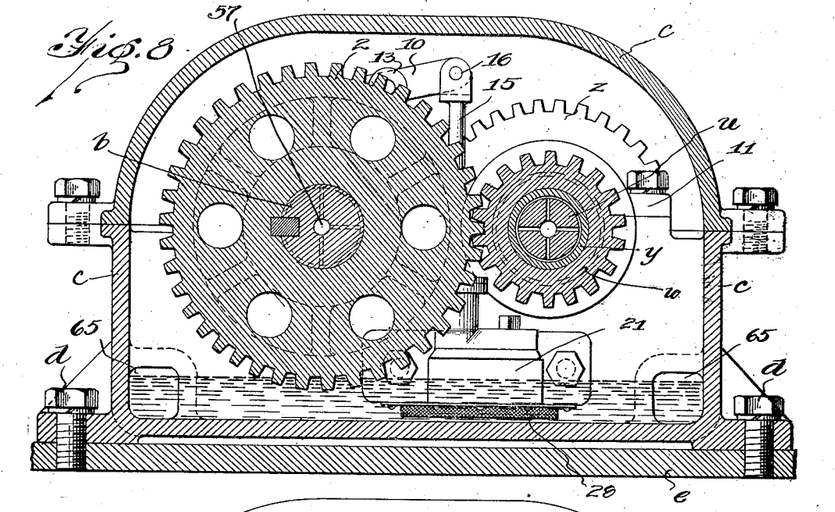
Fig. 8 is a section taken on the line 8—8 of Fig. 1.

At the point where the driven shaft $b$ is supported in the bridge $r$ the said bridge is provided with a bossed hub portion which is counter-bored as at 5 for receiving a thrust bearing 6. Interposed between this thrust bearing and the gear 2 is an eccentric 7 (see also Fig. 7). The eccentric ring 8 engages this eccentric and is connected through a suitable link 9 to one end of the walking beam 10. A cap 11 is bolted to the bridge $r$, the said cap completing the bearing supports for the shafts $o$ $u$ and $b$. Secured to this cap 11 is a bracket 12 which carries in offset relation thereto the bifurcated ears 13 in which the beam 10 is pivoted as at 14. The opposite end of the beam is pivoted to the link connection 15 as at 16, and as the driven shaft is rotated, the eccentric 7 which is keyed or otherwise secured thereto, is rotated and as plainly shown in Fig. 7, will rock the walking beam 10 and reciprocate the link 15. This link 15 is connected to the piston rod 16$^a$ of a suitable oil pump for providing a force feed to the change speed gears to be lubricated. This will be more fully described when the lubricating system is detailed later on in the specification.

It is obvious that when a longitudinal thrust is imparted to the driven shaft $b$, it is absorbed in or resisted by the thrust bearing 6 and the transverse bridge $r$. The shafts $o$ and $u$ which support the change speed gears are independently supported and are relieved from any of said longitudinal thrusts. Where a transmission is used in reducing the speed for driving heavy machinery, it is quite necessary that the transmission mechanism be relieved from the longitudinal thrust and it is plainly seen that the construction of the bridge $r$ within the housing, separates the driven shaft from the transmission mechanism or change speed gears thereby obtaining the desired result to wit: to relieve the said gears and driving shaft from all longitudinal or end thrusts.

Figure 12:
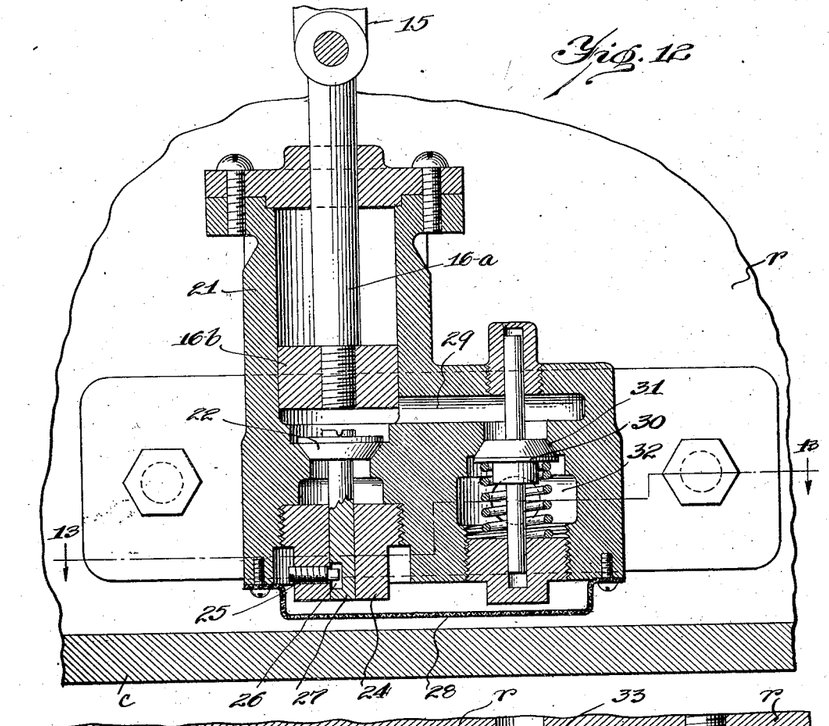
Fig. 12 is a vertical sectional view through the oil pump.
Figure 13:
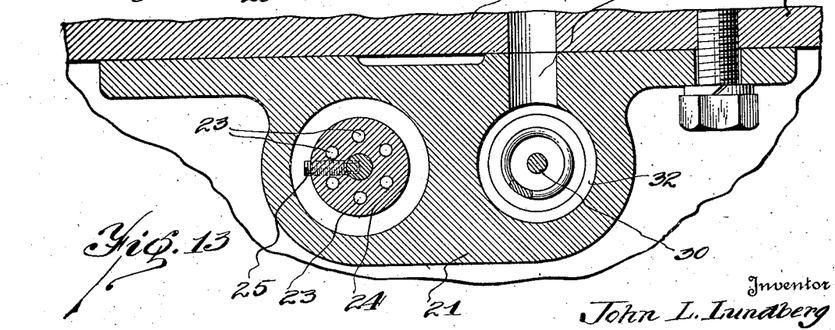
Fig. 13 is a section on the line 13—13 of Fig. 12.

The bridge $r$ is cast as shown in Figs. 5, 6, 10 and 11 so as to provide a reservoir 20. The pump 21 is bolted to the side of the bridge and takes the oil from the bottom of the transmission housing and pumps the same into the reservoir 20. This pump is shown more in detail in Figs. 12 and 13. The pump rod 16$^a$ and piston 16$^b$ are reciprocated back and forth and consequently on the up stroke of the same the valve 22 is lifted thus sucking the oil from the bottom of the transmission casing through the drilled holes 23 in the plug 24 screwed into the bottom of the pump housing. The set screw 25 is carried by this plug the inner end of which extends within an elongated groove 26 carried by the valve stem 27 for limiting the movement of the valve. A screen 28 is secured to the underside of the pump housing and thoroughly strains the oil before it is drawn in to the pump. A lateral passageway 29 connects the pump cylinder above the inlet valve and a spring pressed valve 30 normally closes the port 31. On the down stroke of the plunger the pressure closes the valve 22 and opens the valve 30 and forces the oil into the chamber 32 and thence through the outlet port 33 into the reservoir 20 cast into the bridge $r$.

Figure 1:
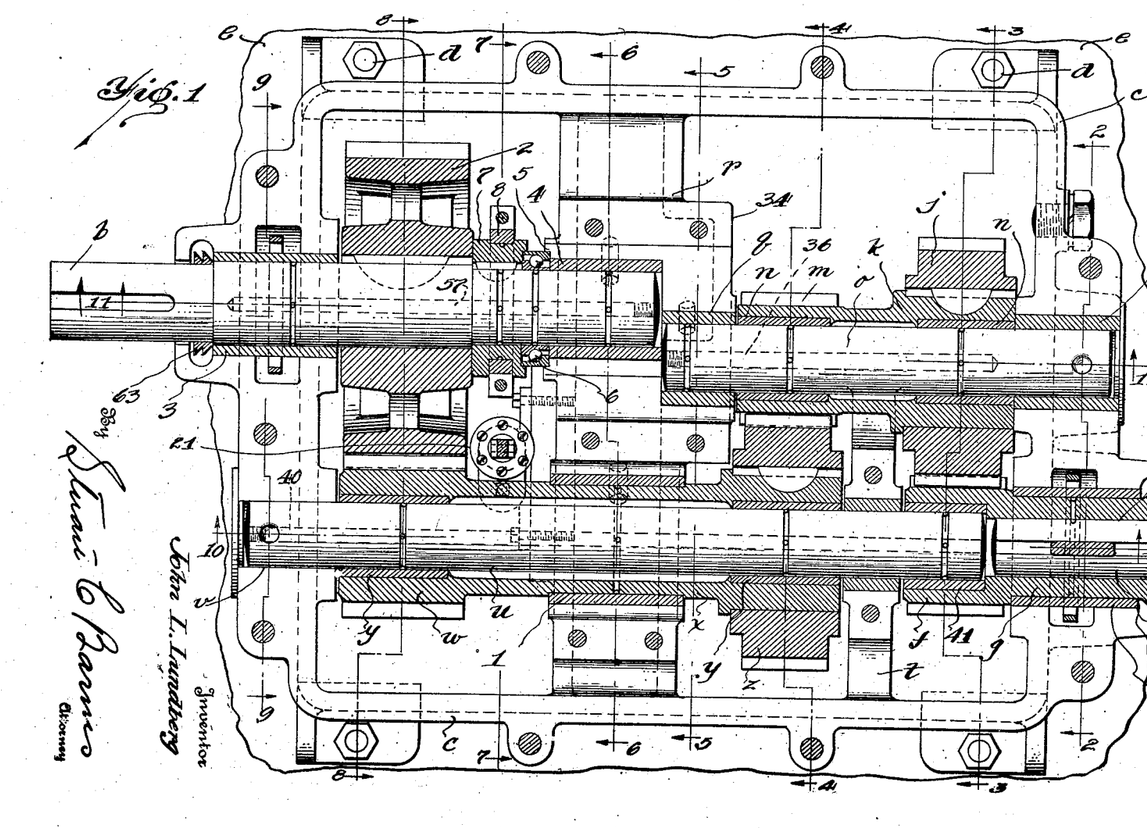
Fig. 1 is a horizontal sectional view through my transmission taken on the line 1—1 of Fig. 2.
Figure 2:
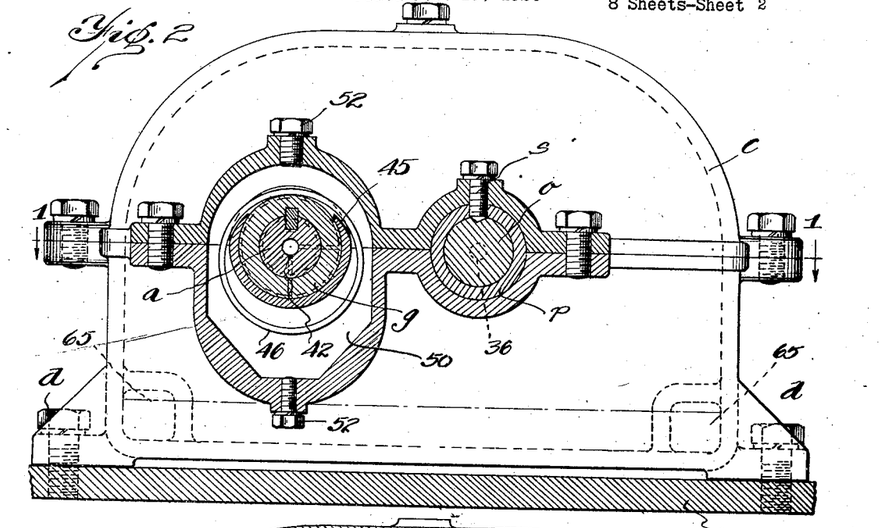
Fig. 2 is a section on the line 2—2 of Fig. 1.
Figure 3:
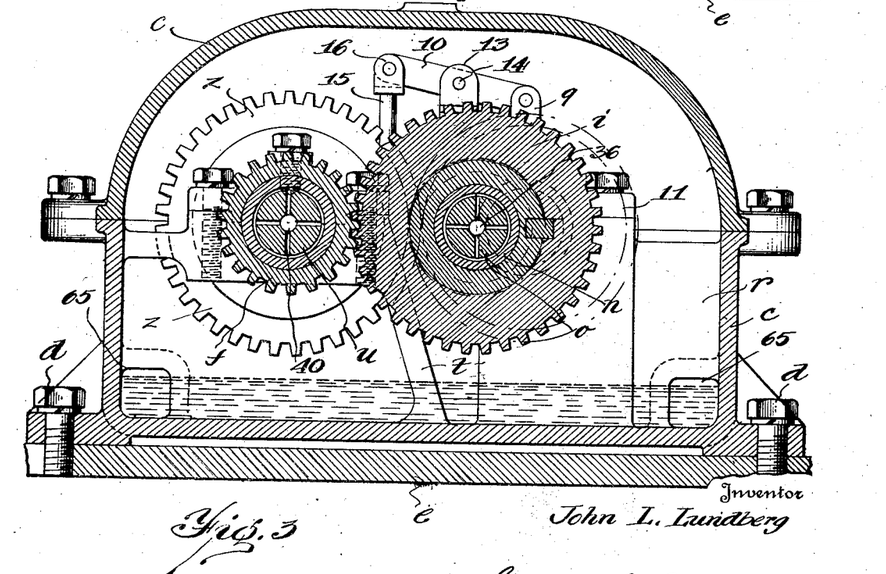
Fig. 3 is a section taken on the line 3—3 of Fig 1.
Figure 4:
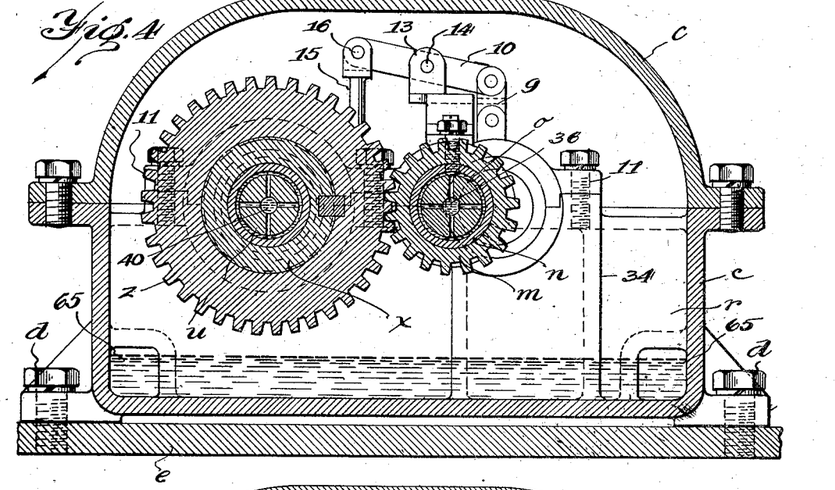
Fig. 4 is a section taken on the line 4—4 of Fig. 1.
Figure 5:
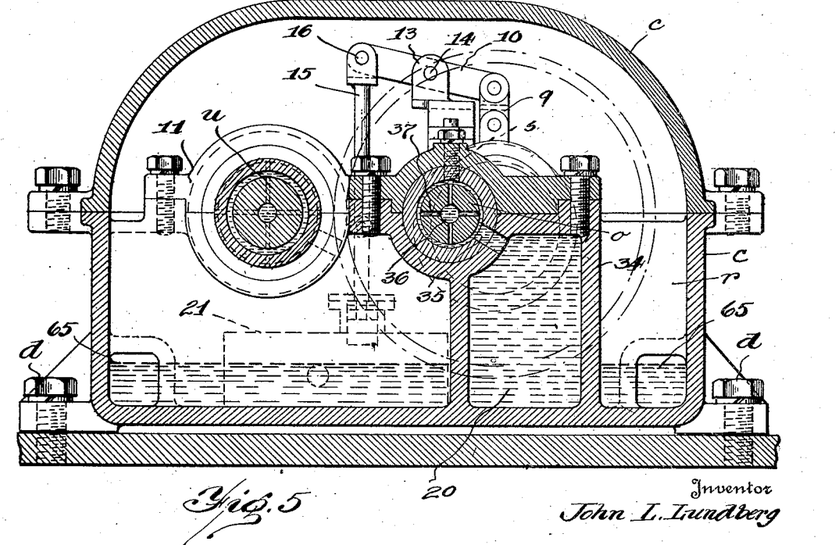
Fig. 5 is a section taken on the line 5—5 of Fig. 1.
Figure 6:
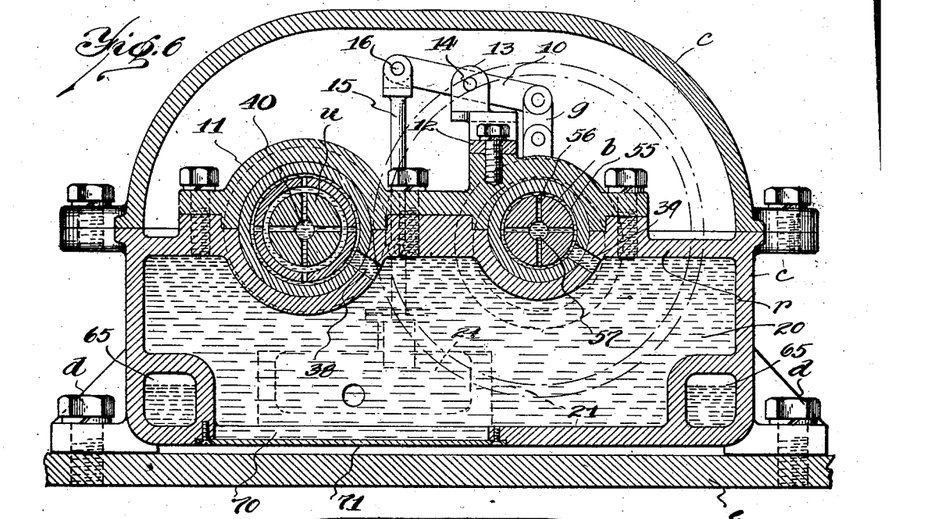
Fig. 6 is a section taken on the line 6—6 of Fig. 1.
Figure 11:
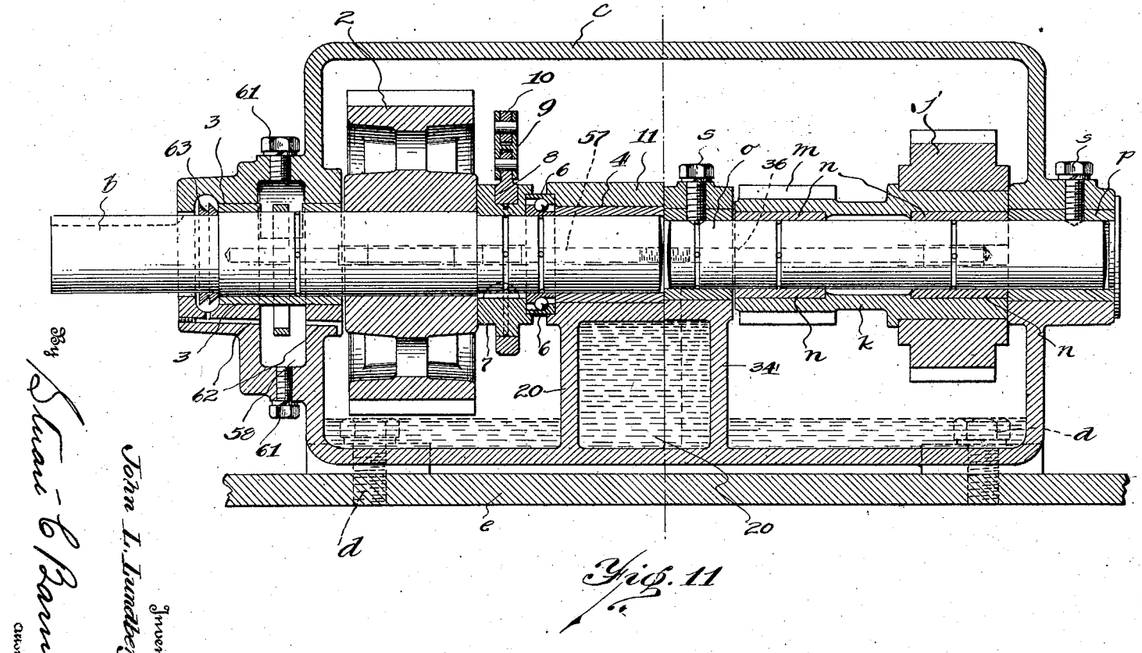
Fig. 11 is a section taken on the line 11—11 of Fig. 1.

Now, referring to Figs. 5 and 6, it will be seen how the oil is conducted from the reservoir 20 into the several shafts. In Figs. 1 and 5 it will be noticed that a portion of the bridge $r$ is enlarged as at 34. This enlarged portion of the reservoir enables the oil to be carried and directly forced through the port 35 into the longitudinally drilled hole 36 within the shaft $o$. As shown, the shaft $o$ is provided with a circular groove registering with the port 35 and a plurality of radially extending drilled holes 37 for conducting the oil to the center hole 36 running longitudinally of the shaft. Referring to Fig. 11, it will be seen how the oil is fed through this conduit 36 to the bearings $n$ that rotatably support the gears $m$ and $j$.

Similarly the ports 38 and 39 conduct the oil to the stationary shaft $u$ and the driven shaft $b$ respectively.

The shaft $u$ is provided with a longitudinally drilled hole 40 (see Fig. 10) which conducts the oil to the bearings $y$ and 1 and also to the bearing 41 carried by the gear $f$ so as to lubricate the bearing surface between this rotating gear and the stationary shaft. The driving shaft $a$ is also drilled for a short distance as at 42. This shaft is provided with holes 43 drilled radially therein. As the hub $g$ is keyed to this shaft, the hub and the shaft $a$ rotate as one unit. However, this hub is drilled as at 44 for conducting the oil to the groove 45 in the hub $g$ for lubricating the bearing $i$. The bearing $i$ is cut away as at 45 (see also Fig. 2) so as to expose a portion of the rotating hub $g$. The oil ring 46 is loosely hung and contacts with the rotating hub $g$. This tends to distribute the oil and prevents the same from being forced out of the drilled hole 44 without lubricating the bearing. The housing $c$ at this end is provided with a cored out chamber 50 cast therein and the hole 51 is drilled through the walls of the housing for conducting the oil from the chamber 50 back into the bottom of the transmission casing. This chamber 50 functions as a sediment chamber and the same may be cleaned from time to time by simply removing the screws 52 and washing the chamber so as to remove the particles of grit that may have accumulated therein.

Returning now to Fig. 6, it will be noticed that the oil is forced through the port 39 into the circular groove 55 carried by the shaft $b$. Holes 56 drilled radially in the shaft $b$ register with the groove 55 and the oil is forced into the longitudinally drilled hole 57 in the shaft $b$. Radial conduits connect this longitudinal oil conduit 57 to the thrust bearing 6 and to the eccentric 7 to provide lubrication for these parts.

Figure 9:
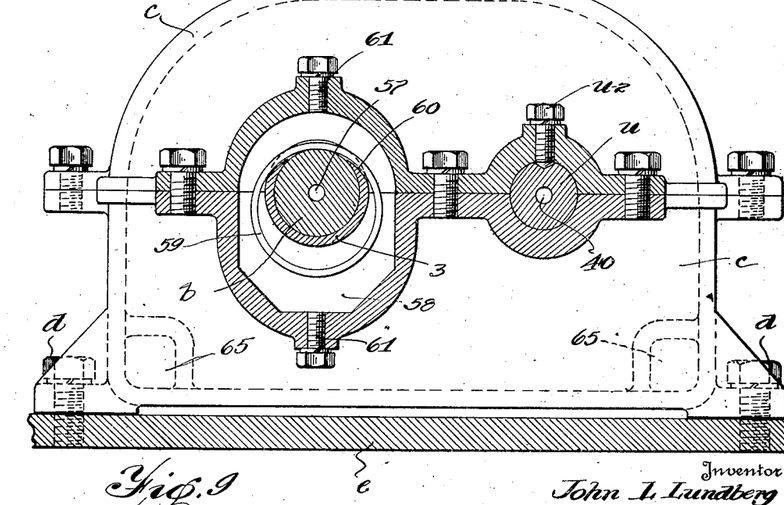
Fig. 9 is a section taken on the line 9—9 of Fig. 1.

The bearing 3 (see also Fig. 9) is lubricated similarly as is the bearing $i$. This end of the housing is cored out as at 58 to provide a sediment chamber and an oil ring 59 is hung about the shaft $b$, the bearing 3 cut away as at 60 so that the oil ring may contact with the revolving shaft. The chamber 58 may be cleaned by removing the cap screw 61 similarly to the way in which the sediment chamber 50 is cleaned. The passageway 62 drilled in the wall of the housing, conducts the oil back into the bottom of the transmission casing.

Figure 10:
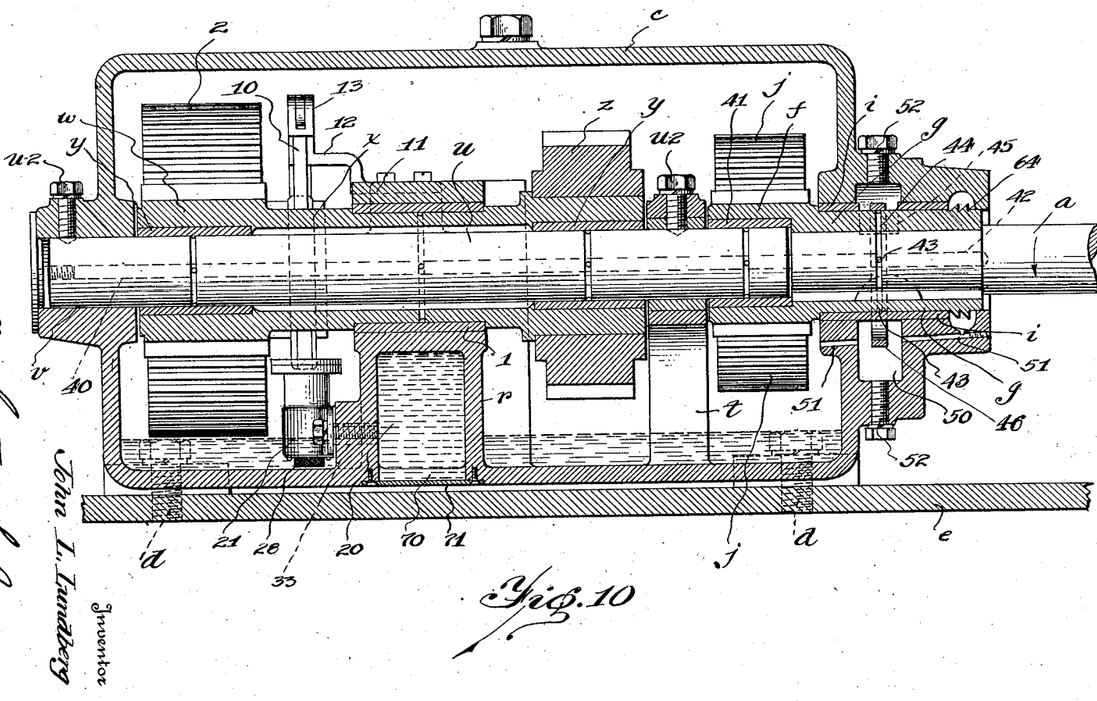
Fig. 10 is a section taken on the line 10—10 of Fig. 1.

A deflector ring 63 is secured near the end of the shaft $b$ and prevents the oil that seeps through the bearing 3 from running along the shaft and out of the transmission. The oil thus deflected is returned back into the passageway 62 and thence into the bottom of the transmission casing. Similar deflector rings 64 are secured to the end of the hub $g$. As shown in Fig. 10, the deflector rings 64 are integrally formed with the hub but obviously the rings could be separate and fitted or otherwise secured to the hub. The oil thus deflected runs down into the passageway 51 and thence returns to the bottom of the transmission casing. Tunnels 65 are formed in the bridge $r$ so that the oil may flow freely from one end of the casing to another.

In assembling the stationary shafts in the transmission housing, it is my purpose to use a jig plate for locating the shaft $o$ in the correct position. The housing is provided with an opening having a larger diameter than the diameter of the shaft. After the shaft has once been located, Babbitt metal is rammed in the opening around the shaft thereby securely locking the shaft in place. This provides a hard bearing for supporting the stationary shaft which in turn rotatably supports in suitable bearings the change speed gears.

An opening 70 is cut in the bottom of the housing and reservoir while a plate 71 is screwed or otherwise secured to the bottom of the housing and covers this opening. The same is then painted over to seal the joint as it is only necessary to change the oil in the transmission about once every two years, at which time the seal may be broken and the cover plate removed so that access may be had to the reservoir for cleaning the same to remove all grit that may have accumulated therein.

In other forms of transmission, the splash system of lubrication is most generally used but I have provided a positive feed for the lubricant to the bearing parts. The pump draws the oil from the bottom of the casing and forces the same into the reservoir, from which it is conducted to the several shafts and thence led to the several bearings. This force oil feed is positive in its action and is especially adapted to one where the use of a heavy lubricating oil is preferable. Obviously, a splash system would not function properly when using such a heavy lubricant.

What I claim is:

1. In a transmission, the combination of a transmission casing, a plurality of change speed gears, suitable bearings for the same, a bridge formed within said casing and having a closed oil reservoir therein, and means for taking the lubricant from the bottom of said casing and forcibly feeding the same to said reservoir.

2. In a transmission, the combination of a transmission casing, a plurality of change speed gears, suitable bearings for supporting the same, a bridge formed within the said casing and having a closed oil reservoir therein, and a pump for taking the lubricant from the bottom of said casing and forcibly feeding the same to said reservoir under pressure.

3. In a transmission, the combination of a transmission casing provided with an oil reservoir closed to the atmosphere, a plurality of change speed gears, suitable bearings for supporting the same, conduits connecting the oil reservoir with said bearings, and means for taking the oil from the bottom of the transmission casing and forcibly feeding the same to said reservoir for the purpose of lubricating the bearings.

4. In a transmission, the combination of a transmission casing provided with an oil reservoir closed to the atmosphere, a plurality of change speed gears, suitable bearings and shafts supported by said casing for carrying the change speed gears, said shafts provided with conduits running longitudinally thereof, said casing provided with passageways connecting the oil reservoir to the said conduits in the shafts, and means for taking the oil from the bottom of the casing and forcibly feeding the same to said reservoir under pressure for lubricating the bearings.

5. In a transmission, the combination of a transmission casing, a plurality of change speed gears supported thereby in suitable bearings, a bridge extending transversely of said casing and integrally formed therewith, said bridge containing an oil reservoir closed to the atmosphere, and a pump for taking the lubricant from the bottom of the casing and forcibly feeding the same to the reservoir.

6. In a transmission, the combination of a transmission casing, a plurality of change speed gears provided with suitable bearings for supporting the same, a bridge extending transversely of said casing and containing an oil reservoir, and dividing the casing into two chambers, means for forcibly feeding a lubricant to said reservoir, and tunnels through said bridge for connecting the two chambers of said transmission case.

7. In a transmission, the combination of a case provided with a bridge, power transmission and speed reducing elements located within the case, and a pump unit which may be removably secured to the bridge, said case provided with passageways in communication with the bearings for the speed-change elements and with the pump, said pump arranged to take lubricant from the bottom of the case and distribute it under pressure to the several bearings.

8. In a transmission, the combination of a case power transmission and speed reducing elements located within the case, the said case provided with a member arranged to rotatably support some of said elements and which is provided with a hollow portion forming an oil reservoir substantially below the elements to be lubricated, a pump unit associated with said member and arranged to take oil from the bottom of the case and pump the same into said reservoir, the said case provided with passageways connected with said reservoir and arranged to deliver oil therefrom to said power transmission and speed reducing elements.

In testimony whereof I affix my signature.

JOHN L. LUNDBERG.